US 6,675,343 B1

(12) United States Patent
Suzuki et al.

(10) Patent No.: US 6,675,343 B1
(45) Date of Patent: Jan. 6, 2004

(54) CODE ERROR CORRECTING AND DETECTING APPARATUS

(75) Inventors: Takayuki Suzuki, Gifu (JP); Hiroyuki Tsuda, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 396 days.

(21) Appl. No.: 09/692,893

(22) Filed: Oct. 20, 2000

(30) Foreign Application Priority Data

Oct. 21, 1999 (JP) ............................................. 11-299908

(51) Int. Cl.[7] ......................... H03M 13/00; G11C 29/00
(52) U.S. Cl. ...................................... 714/755; 714/769
(58) Field of Search ........................ 714/755, 756, 714/769

(56) References Cited

U.S. PATENT DOCUMENTS 6,094,465 A * 7/2000 Stein et al. .................. 375/346
6,182,261 B1 * 1/2001 Haller et al. ................. 714/758

FOREIGN PATENT DOCUMENTS

WO         WO 9843360 A1 * 10/1998 .......... H03M/13/00

OTHER PUBLICATIONS

Stephen B. Wicker, Error Control Systems for Digital Communication and Storage, Prentice–Hall, 1995.*

* cited by examiner

Primary Examiner—Albert Decady
Assistant Examiner—Joseph D. Torres
(74) Attorney, Agent, or Firm—Fish and Richardson, P.C.

(57) ABSTRACT

A code error correcting and detecting apparatus includes a controller that repetitively processes error correction and detection of encoded CD-ROM data, thereby relieving a control microprocessor of a CD-ROM system of the burden associated with such repetitive processing. The apparatus includes an error correction circuit that performs code error correction on digital data, such as digital data read from a CD, using an error-correcting code (ECC). An error detection circuit performs error detection on the error-corrected digital data using an error-detecting code (EDC) and determines whether there is an error. A control circuit causes the error-correction circuit to repeat its error-correction processing in accordance with the detection of an error by the error detection circuit.

9 Claims, 4 Drawing Sheets

CODE ERROR CORRECTING AND DETECTING APPARATUS

BACKGROUND OF THE INVENTION

The present invention relates to a code error correcting and detecting apparatus, and, more particularly, to a code error correcting and detecting apparatus that corrects an error contained in digital data read from a recording medium, such as a CD (compact disc) or a DVD (digital video disc), and performs processing using an error-detecting code.

When a computer acquires digital data recorded on a recording medium, decode processing for correcting a code error contained in the digital data is performed using a drive system, such as a CD-ROM system. Since the decode processing is performed in units of sectors, each consisting of a predetermined number of bytes, the digital data is buffered in a memory in units of sectors.

FIG. 1 is a schematic block diagram of a conventional CD-ROM system 100. Digital data that conforms to a predetermined format is recorded on a disc 1 along a spiral recording track. The disc 1 rotates so that a linear velocity or an angular velocity is maintained constant. A pickup 2 irradiates the surface of the disc 1 with laser light and reads the digital data recorded on the disc 1 in accordance with a variation of the reflected light. An analog signal processor 3 processes an analog output signal from the pickup 2 and generates an Eight to Fourteen Modulation (EFM) signal indicating the digital data. The EFM signal is generated by EFM-modulating 8-bit data. As shown in FIG. 2, for EFM data, the first 24 bits of one frame are assigned to a synchronous field, and a three bit connection field and a 14 bit data field are alternately assigned after the synchronous signal.

A digital signal processor 4 receives the EFM signal from the analog processor 3, applies EFM demodulation to the EFM signal and, as shown in FIG. 2, converts the 14-bit data to 8-bit data. In the EFM demodulation, 1-byte of subcode data is fetched from the first data field after a synchronous signal and 32-bytes of symbol data are generated from the remaining data fields. The digital signal processor 4 applies CIRC decoding to the 32-bytes of symbol data and generates 24-bytes of CD-ROM data.

A CD-ROM decoder 5 receives the CD-ROM data from the digital signal processor 4, performs a code error correction on the CD-ROM data and transfers the corrected CD-ROM data to a host computer in accordance with a request from the host computer. A buffer RAM 6 is connected to the CD-ROM decoder 5 and stores the CD-ROM data supplied from the digital signal processor 4 for a predetermined time. Since an Error-Correcting Code (ECC) and an Error-Detecting Code (EDC) are set for the one-sector CD-ROM data, at least one sector of CD-ROM data is stored in the buffer RAM 6. Further, several sectors of error-corrected CD-ROM are stored in the buffer RAM 6.

A control microcomputer 7 controls the analog signal processor 3, the digital signal processor 4 and the CD-ROM decoder 5 using a predetermined operation program. The control microcomputer 7 controls the analog signal processor 3, the digital signal processor 4 and the CD-ROM decoder 5 in accordance with a request from the host computer to transfer the CD-ROM data to the host computer.

FIG. 3 is a schematic block diagram of the CD-ROM decoder 5. The CD-ROM decoder 5 comprises an input interface 11, an error correction circuit 12, an error detection circuit 13, an output interface 14 and a memory interface 15.

The input interface 11 receives 2,352 bytes of one block of CD-ROM data from the digital signal processor 4 and supplies the CD-ROM data to the memory interface 15. The input interface 11 performs descramble processing on the CD-ROM data, except for a 12-byte synchronous signal and stores the descrambled CD-ROM data in the buffer RAM 6.

The error correction circuit 12 receives the CD-ROM data stored in the buffer 6 in units of blocks and performs the code error correction processing on the CD-ROM data using the ECC every block. Erroneous CD-ROM data stored in the buffer RAM 6 is rewritten with correct data.

The error detection circuit 13 receives error-corrected CD-ROM data from the buffer RAM 6 in units of blocks and checks whether a code error is contained in the CD-ROM data using the EDC every block. If the error code is detected by the error detection circuit 13, an error flag is added to the error-corrected CD-ROM data.

The output interface circuit 14 reads the processed CD-ROM data stored in the buffer RAM 6 in response to an instruction from the host computer and supplies the processed CD-ROM data to the host computer. The output interface circuit 14 receives control information from the host computer and supplies the control information to the control microcomputer 7.

The memory interface 15 controls the input/output of CD-ROM data between the buffer RAM 6 and the input interface 11, the error correction circuit 12, the error detection circuit 13 and the output interface 14 in a time-division manner. That is, a plurality of the CR-ROM data cannot be written to and read from the buffer RAM 6 at the same time. Accordingly, the memory interface 15 assigns access from each circuit to the buffer RAM 6 in conformity with the operation of each circuit.

Error correction accuracy is improved by repeating code error correction processing by the error correction circuit 13. For example, if P-parity code and Q-parity code are set regarding the ECC, an error contained in the data is decreased by increasing the number of repetitions of the correction processing which uses the P-parity code and the correction processing which uses the Q-parity code.

When code error correction processing is repeated, all of circuit operations are controlled in accordance with an instruction from the control microcomputer. Accordingly, repetition of the correction processing increases the burden on the control microcomputer, so that a delay occurs in the processing operation of each circuit.

SUMMARY OF THE INVENTION

An object of the present invention is to provide a code error correcting and detecting apparatus that reduces the burden on a control microcomputer when code error correction processing is repetitively performed.

In one aspect of the present invention, an apparatus for correcting and detecting a code error in digital data including an error correcting code and an error detecting code is provided. The apparatus includes an error correction circuit for performing error correction processing on the digital data using the error-correcting code and generating error-corrected digital data. An error detection circuit performs error detection processing on the error-corrected digital data using the error-detecting code and checks whether an error is included in the error-corrected digital data. A control circuit is connected to the error correction circuit and the error detection circuit to causes the error correction circuit to repeat the error correction processing on the digital data in accordance with the check result of the error detection circuit.

In another aspect of the present invention, a method for correcting and detecting a code error in digital data including an error correcting code and an error detecting code is provided. First, error correction processing on the digital data is performed using the error-correcting code to generate error-corrected digital data. Then, error detection processing on the error-corrected digital data is performed using the error-detecting code and checking whether an error is included in the error-corrected digital data. A repetitive operation setting command of the error correction processing is stored in a first register. The check result of the error detection processing is stored in a second register. The error correction processing is repeated when the setting command stored in the first register indicates repetitive operation and the check result stored in the second register indicates the presence of a code error.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
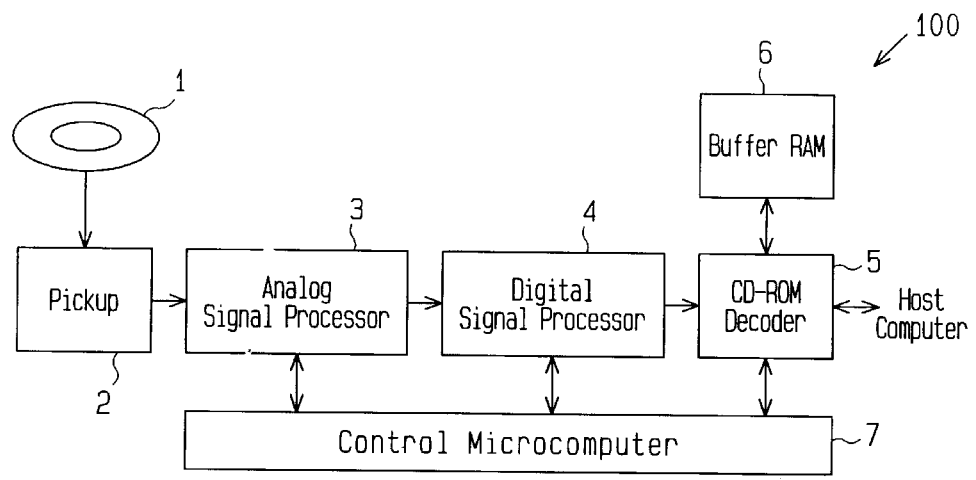
FIG. 1 is a schematic block diagram of a conventional CD-ROM system.
Figure 2:
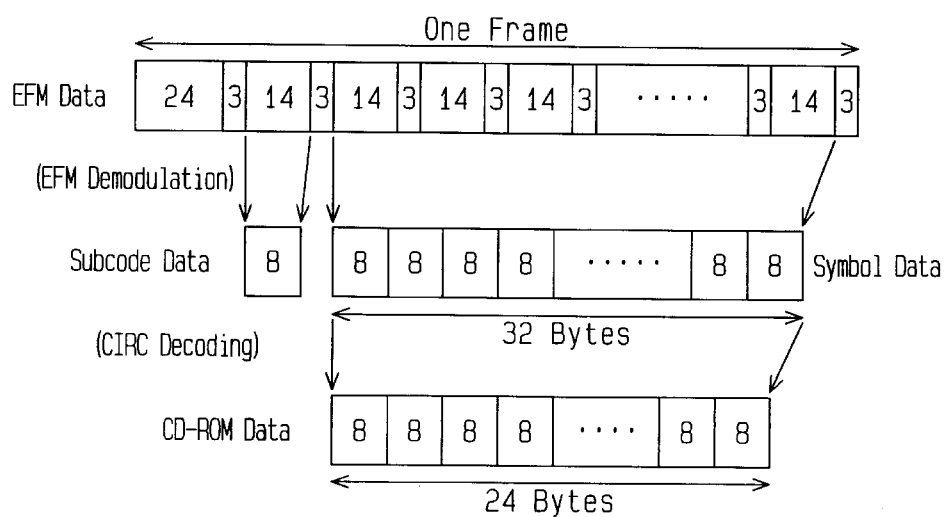
FIG. 2 is a diagram showing a format of one-frame of CD-ROM data.
Figure 3:
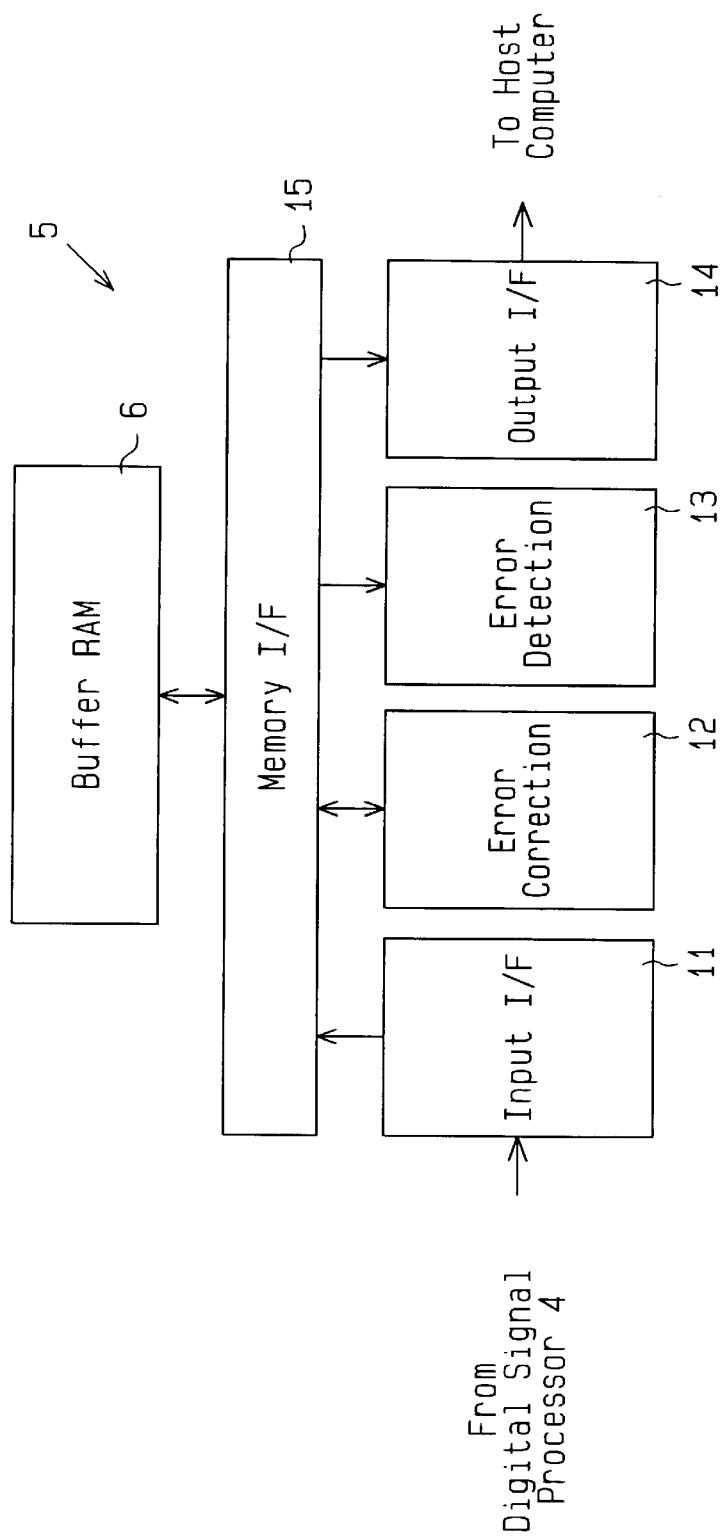
FIG. 3 is a schematic block diagram of a conventional CD-ROM decoder.

In the drawings, like numerals are used for like elements throughout.

Figure 4:
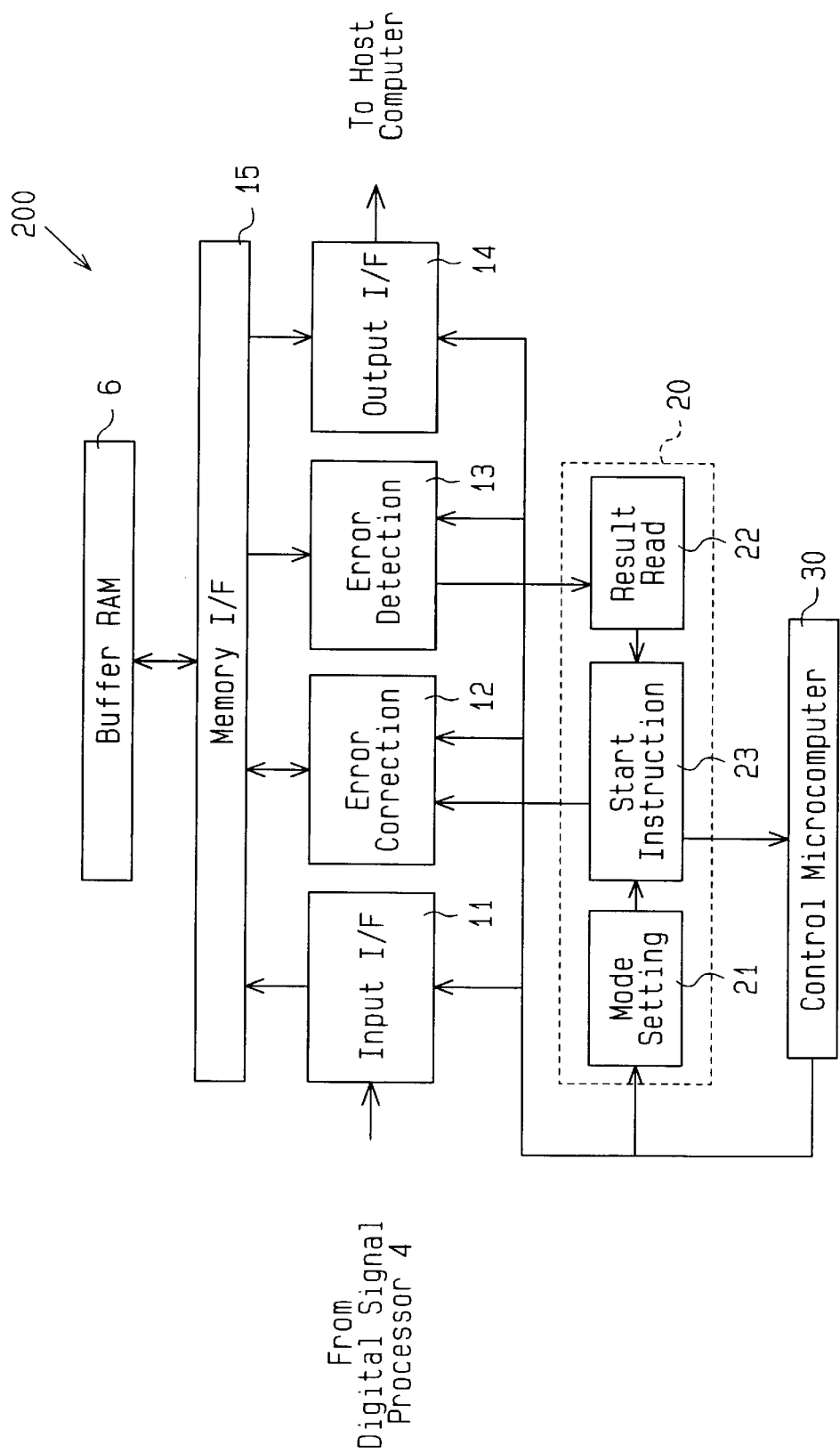
FIG. 4 is a schematic block diagram of a code error correcting and detecting apparatus according to one embodiment of the present invention.

FIG. 4 is a schematic block diagram of a CD-ROM decoder 200 as a code error correcting and detecting apparatus according to one embodiment of the present invention.

The CD-ROM decoder 200 comprises an input interface circuit 11, an error correction circuit 12, an error detection circuit 13, an output interface 14, a memory interface 15 and a control circuit 20. The control circuit 20 controls the error correction operation that is repeated by the error correction circuit 12.

The input interface 11 receives CD-ROM data from the digital signal processor 4 and supplies the CD-ROM data to the memory interface 15. The output interface circuit 14 reads error-corrected and detected CD-ROM data from the buffer RAM 6 via the memory interface 15 and supplies the processed CD-ROM data to the host computer.

The error correction circuit 12 performs code error correction processing on the CD-ROM data stored in the buffer RAM 6 using the ECC one-block at a time and generates error-corrected CD-ROM data. Specifically, the error correction circuit 12 performs the correction processing including the error correction that uses a P-code and the correction processing that uses a Q-code one time or multiple times.

The error detection circuit 13 performs code error detection processing on the error-corrected CD-ROM data using the EDC and supplies an error detection result to the control circuit 20.

The control circuit 20 includes a mode setting circuit 21, a result read circuit 22 and a start instruction circuit 23. The mode setting circuit 21 holds a plurality of control commands supplied from a control microcomputer 30. The mode setting circuit 21 is preferably a register. The control commands specify the operation mode of the error correction circuit 12. That is, the control commands include the command that specifies which correction processing is performed first in two types of correction processing and the command that specifies how many times the two types of correction processing are repeated.

The result read circuit 22 receives the code error detection result from the error detection circuit 13 and holds the received detection result until the next new detection result is supplied from the error detection circuit 13. The result read circuit 22 is preferably a register.

The start instruction circuit 23 receives the control commands from the mode setting circuit 21 and the detection result from the result read circuit 22 and provides a correction processing start instruction to the error correction processing circuit 12 in accordance with the control commands and the detection result.

The start instruction circuit 23 receives an initialized control command in first correction processing from the mode setting circuit 21 and operates the error correction processing circuit 12 in accordance with the initialized control command. If the correction processing is repeated two or more times, the start instruction circuit 23 repetitively operates the error correction processing circuit 12 in accordance with the initialized control command or another control command supplied from the mode setting circuit 21. That is, if second correction processing is the same as the first correction processing, a start instruction according to the initialized control command is provided to the error correction circuit 12. Further, if the second correction processing is different from the first correction processing, a start instruction according to another control command supplied from the control microcomputer 30 is provided to the error correction circuit 12.

The start instruction circuit 23 has a predetermined upper limit for the number of repetitions of error correction processing. This upper limit can optionally be varied. The start instruction circuit 23 counts the number of times a start instruction is given to the error correction circuit 12, and when the count value reaches the upper limit, the start instruction circuit 23 stops the correction processing of the error correction processing circuit 12. It is preferable that the upper limit of the number of repetitions is supplied from the control microcomputer 30 to the start instruction circuit 23. It is preferable that the upper limit is set in accordance with the ratio between the time required for the one-block error correction processing and the time assigned to the processing on the one-block (one-sector) CD-ROM data.

By using the control circuit 20, code error correction processing by the error correction circuit 12 can be repeated automatically regardless of an indication from the control microcomputer 30. At this time, since the control microcomputer 30 only determines control commands or the upper limit of the number of repetitions, the burden on the control microcomputer 30 is not increased.

Figure 5:
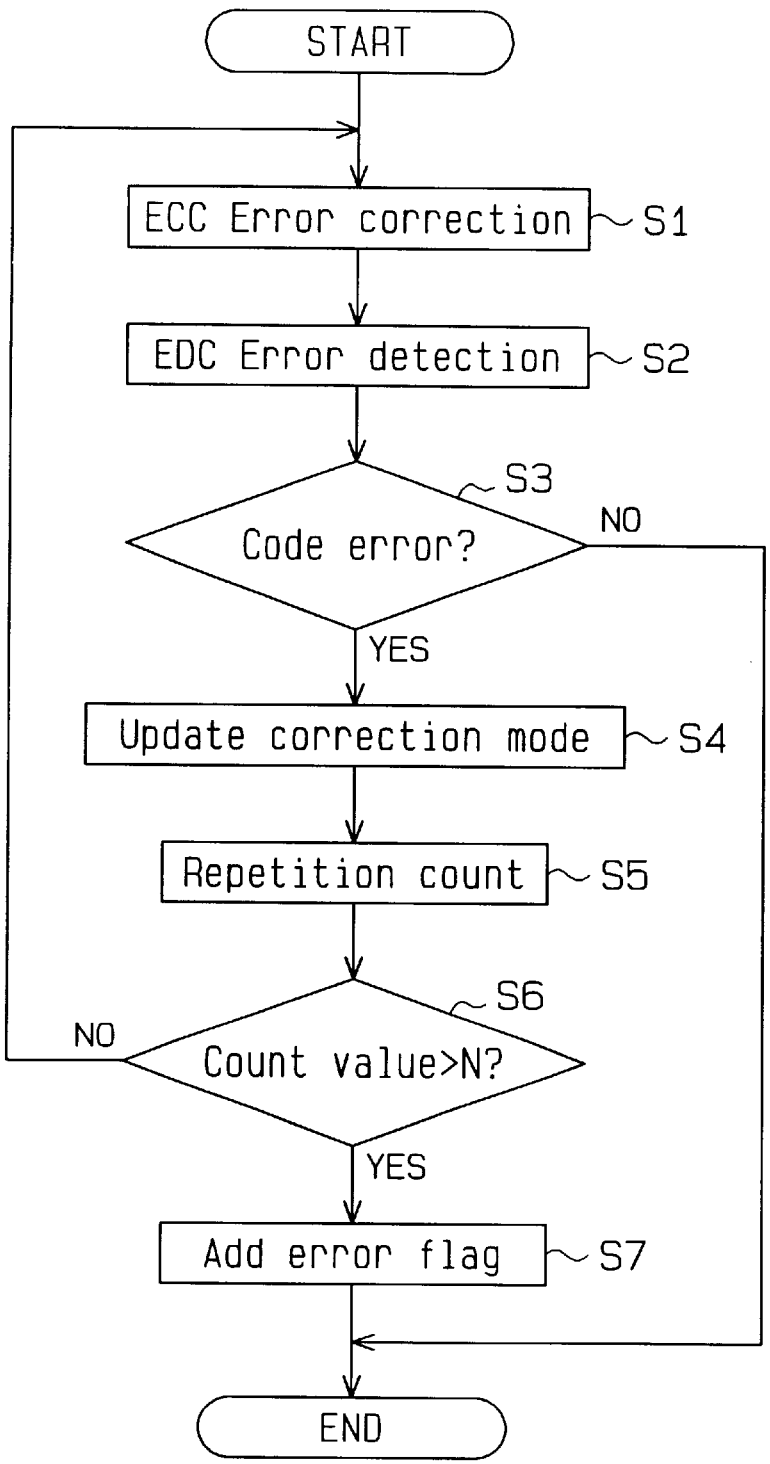
FIG. 5 is a flowchart for describing the operation of the apparatus of FIG. 4.

FIG. 5 is a flowchart for describing the repetitive operation of code error correction processing in the CD-ROM decoder 200.

In the first step S1, the error correction circuit 12 performs code error correction processing on the CD-ROM data in accordance with an initialized error correction mode using the ECC. Specifically, the Q-code error correction processing is performed after the P-code error correction processing.

In the second step S2, the error detection circuit 13 performs code error detection processing on the error-correction processed CD-ROM data using the EDC.

In the third step S3, the start instruction circuit 23 determines whether a code error is left behind in the CD-ROM data based on a code error detection result obtained from the error detection circuit 13. If no code error is included in the CD-ROM data, the start instruction circuit 23 indicates the end of the error correction processing to the error correction circuit 12, and if there is a code error, processing moves to the fourth step S4.

In the fourth step S4, the mode setting circuit 21 updates the error correction processing mode in accordance with another control command supplied from the control microcomputer 30. That is, the initialized control command is updated and the start instruction circuit 23 operates the error correction circuit 12 in accordance with a new mode. For example, if error correction processing is performed in the order of the P-code to the Q-code in the initial state, the processing is changed to the error correction processing which uses only the Q-code or the error correction processing performed in the order of the Q-code to the P-code. The error correction processing mode may be changed each time the error correction processing is repeated or may be changed each time the error correction processing is repeated a number of appropriate times. In this case, the error correction processing is performed in the same mode every time. Further, the error correction mode can also be changed in a fifth step S5 or a sixth step S6.

In the fifth step S5, the start instruction circuit 23 counts the number of error correction processing times. For example, whenever a start instruction is provided from the start instruction circuit 23 to the error correction 12, a count value is incremented.

In the sixth step S6, the start instruction circuit 23 determines whether the count value has reached an upper limit N. If the count value (the number of correction processing times) reaches the upper limit, processing moves to the seventh step S7. If it is not reached, processing returns to the first step S1. In the first step S1, error correction processing is performed in accordance with the mode updated in the fourth step S4.

In the seventh step S7, the start instruction circuit 23 instructs the microcomputer 30 to add an error flag and instructs the end of the error correction processing to the error correction circuit 12. That is, if the number of error correction processing times reaches the upper limit N, the control microcomputer 30 controls the error detection circuit 13 and adds an error flag indicating a code error is included, to the CD-ROM data. That is, the control circuit 20 controls the error correction circuit 12 so that error correction processing is repeated only the allowable number of times. The control microcomputer 30 may only supply the control command, such as initialization, to the control circuit 20. Accordingly, even if the error correction is repeated, the burden on the control microcomputer 30 is not increased.

It should be apparent to those skilled in the art that the present invention may be embodied in many other specific forms without departing from the spirit or scope of the invention. Particularly, it should be understood that the invention may be embodied in the following forms.

This invention may also apply to a decoder which repeats code error correction processing and detection processing on the data recorded on a recording medium as well as a CD-ROM decoder.

Therefore, the present examples and embodiments are to be considered as illustrative and not restrictive and the invention is not to be limited to the details given herein, but may be modified within the scope and equivalence of the appended claims.

What is claimed is:

1. An apparatus for correcting and detecting a code error in digital data including an error correcting code and an error detecting code, comprising:

an error correction circuit for performing error correction processing on the digital data using the error-correcting code and generating error-corrected digital data;

an error detection circuit for performing error detection processing on the error-corrected digital data using the error-detecting code and checking whether an error is included in the error-corrected digital data; and a control circuit, connected to the error correction circuit and the error detection circuit, for causing the error correction circuit to repeat the error correction processing on the digital data in accordance with the a check result of the error detection circuit in response to a command from an external computer.

2. The apparatus of claim 1, wherein the apparatus is connected to a buffer memory for storing the digital data and the error correction circuit rewrites erroneous digital data stored in the buffer memory, and the apparatus further comprising:

an input interface for receiving the digital data and storing the digital data in the buffer memory; and an output interface for receiving from the buffer memory the error-corrected digital data stored therein and supplying the corrected digital data to an external device.

3. The apparatus of claim 2, wherein the control circuit includes:

a first register for storing a repetitive operation setting command of the error correction circuit;

a second register, connected to the error detection circuit, for storing the check result of the error detection circuit; and a start instruction circuit, connected to the first and second registers, for restarting the error correction circuit when the repetitive operation setting command indicates repetitive operation and the check result indicates the presence of a code error.

4. The apparatus of claim 3, wherein the start instruction circuit counts the number of start times and stops the operation of the error correction circuit when a count value reaches a predetermined value.

5. The apparatus of claim 4, wherein the error correction circuit performs digital data error processing in units of blocks and the predetermined value is set according to a ratio of the time required for the error correction processing on one-block of the digital data and the time assigned to the processing of the one-block of the digital data.

6. The apparatus of claim 1, wherein the control circuit includes:

a first register for storing a repetitive operation setting command of the error correction circuit;

a second register, connected to the error detection circuit, for storing the check result of the error detection circuit; and a start instruction circuit, connected to the first and second registers, for restarting the correction circuit when the setting command indicates repetitive operation and the check result indicates the presence of a code error.

7. A method for correcting and detecting a code error in digital data including an error correcting code and an error detecting code, the method comprising the steps of:

performing error correction processing on the digital data using the error-correcting code to generate error-corrected digital data;

performing error detection processing on the error-corrected digital data using the error-detecting code and checking whether an error is included in the error-corrected digital data;

receiving, by a control circuit, a repetitive operation setting command from an external computer;

storing the repetitive operation setting command of the error correction processing in a first register;

storing the check result of the error detection processing in a second register; and controlling, by the control circuit, repeating the error correction processing when the setting command stored in the first register indicates repetitive operation and a check result stored in the second register indicates the presence of a code error.

8. The method of claim 7 further comprising the steps of:

counting the number of times error correction processing is performed; and ending the error correction processing when a count value reaches a predetermined value.

9. The method of claim 8, wherein the error correction processing includes performing error correction processing on the digital data in units of blocks and the predetermined value is set in accordance with a ratio of the time required for the error correction processing on one-block of the digital data and the time assigned to the processing of the one-block of the digital data.

* * * * *